J. W. BUTLER.
PIE TRIMMER AND CRIMPER.
APPLICATION FILED FEB. 21, 1907.

907,456.

Patented Dec. 22, 1908.

Witnesses:
Harry D. Rapp.
Christ Feinle.

Jay W. Butler, Inventor
By Emil Neuhart,
Attorney.

UNITED STATES PATENT OFFICE.

JAY W. BUTLER, OF HERMITAGE, NEW YORK, ASSIGNOR OF ONE-HALF TO HENRY J. WALZ, OF BUFFALO, NEW YORK.

PIE TRIMMER AND CRIMPER.

No. 907,456.  Specification of Letters Patent.  Patented Dec. 22, 1908.

Application filed February 21, 1907. Serial No. 358,627.

*To all whom it may concern:*

Be it known that I, JAY W. BUTLER, a citizen of the United States, residing at Hermitage, in the county of Wyoming and State of New York, have invented certain new and useful Improvements in Pie Trimmers and Crimpers, of which the following is a specification.

My invention relates to improvements in pie trimmers and crust perforators, and its object is the production of a simple, effective and inexpensive device with which the overlapping portions of the crust are cut away and the marginal portion of the pie crimped, and whereby the crust may be initialed to designate the kind of pie, and perforated to permit the escape of steam from within while baking.

The invention consists in the construction and combination of parts to be hereinafter described and particularly pointed out in the appended claim.

Reference is to be had to the accompanying drawings forming part of this specification, in which similar numerals of reference refer to similar parts in the several figures.

Figure 1:
Figure 2:
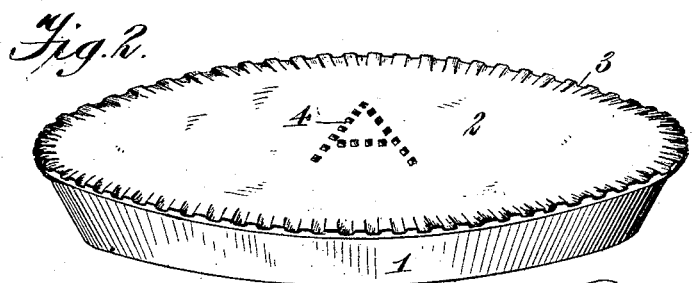
Figure 3:
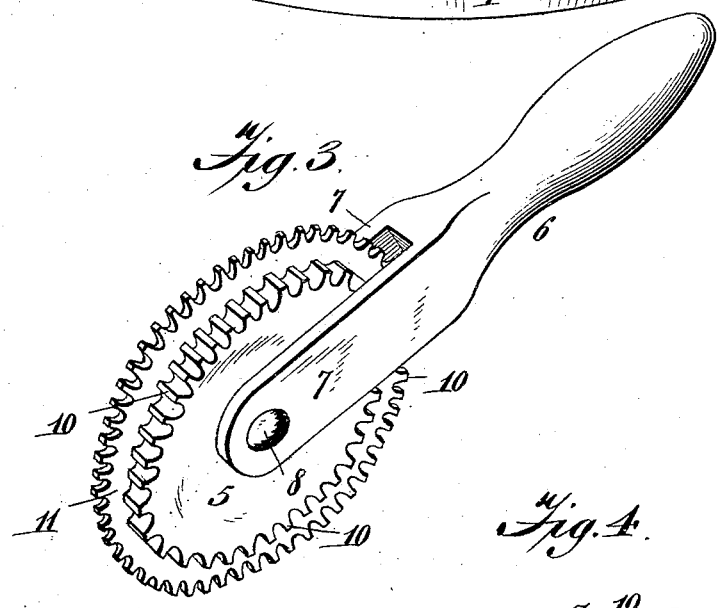
Figure 4:
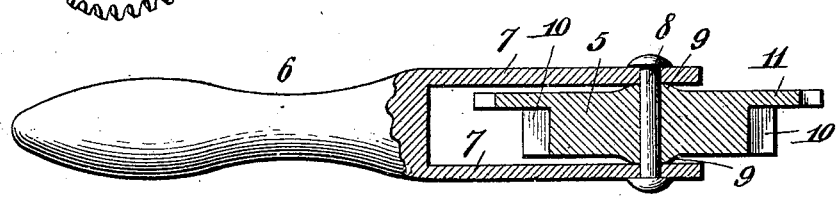

Figure 1 is a central section through a pie-plate and a pie therein, showing the manner of using my improved device. Fig. 2 is a perspective view of a pie within a pie-plate showing the pie trimmed and crimped, and the upper crust marked and perforated. Fig. 3 is a perspective view of my improved device. Fig. 4 is a longitudinal section of the same.

The reference numeral 1 designates the pie-plate, 2 the pie, trimmed and crimped at its margin, as at 3, and marked and perforated through the upper crust, as shown at 4.

It has been the practice heretofore to mark the upper crust of a pie with a sharp tool cutting through the crust to permit the escape of the steam from within; while serving at the same time to initial the pie; but invariably while baking, the crust bulged outward where cut, by the steam pressure within, resulting in total elimination of the identifying letter previously formed.

My device comprises a disk 5, a suitable handle 6, preferably forked to provide two arms 7 lying on opposite sides of the disk, and a spindle 8 passed through the disk and secured in the arms of the handle. Arranged centrally on opposite sides of the disk which is loosely mounted to revolve on said spindle, are bosses 9 serving to hold the sides of the disk out of contact with the arms of the handle, thus allowing free action of the disk within said handle.

The disk has its periphery provided with crimping-teeth 10 and it also has a narrow toothed peripheral flange 11 wherewith any initial may be marked upon the upper crust of the pie by puncturing the crust with small openings through which the steam may escape from within the pie while baking. In this manner cutting of the crust is avoided and consequently it cannot bulge outward when baking, to obliterate the initial. Any initial can be quickly and conveniently formed in the crust of the pie to indicate the kind of pie. When crimping and trimming a pie, the peripheral flange 11 is held against the edge of the pie-plate and the peripheral crimping teeth 10 are pressed against the marginal portion of the crust and press the two layers of dough together. Now on revolving the disk the overhanging portions of the upper and lower layers are cut away and the marginal portion of the upper layer or crust is neatly crimped.

If desired two disks of different diameter may be secured together, in which case the smaller or crimping disk may be of wood and the marking and trimming disk may be of metal, and when referring to a disk in the subjoined claim, I wish to include a "built-up" disk as well as a one-piece disk.

Having thus described my invention, what I claim is,—

An article of manufacture of the character described, comprising a rotary disk provided with peripheral crimping-teeth and a narrow peripheral flange also provided with peripheral teeth, whereby a pie may be trimmed, crimped, marked, and punctured to allow the escape of steam while baking.

In testimony whereof, I have hereunto affixed my signature in the presence of two subscribing witnesses.

JAY W. BUTLER.

Witnesses:
 HENRY J. WALZ,
 EMIL NEUHART.